July 15, 1941.  C. H. FROST  2,249,707
LEVELING ROD
Filed May 18, 1940  2 Sheets-Sheet 1

Inventor
Cheslyn H. Frost
by
Attorney

July 15, 1941.  C. H. FROST  2,249,707
LEVELING ROD
Filed May 18, 1940   2 Sheets-Sheet 2

Inventor
Cheslyn H. Frost
by
Attorney

Patented July 15, 1941

2,249,707

UNITED STATES PATENT OFFICE 2,249,707

LEVELING ROD

Cheslyn H. Frost, Tulsa, Okla., assignor of one-half to Engineering Laboratories, Inc., Tulsa, Okla.

Application May 18, 1940, Serial No. 335,999

5 Claims. (Cl. 33—74)

This invention relates to surveying instruments and particularly to leveling rods for use in surveying.

In many surveying operations, particularly when conducted in rough and broken country, many settings of the leveling rod may be required to survey a given area, particularly when using rods of conventional length and construction. Conventional rods are ordinarily form twelve to fourteen feet long, though some have sliding extensions which permit additional lengthening. However, the maximum length of such rods is limited in practice, particularly by their instability and the difficulty of maintaining them in a true vertical position. There are additional disadvantages in the use of long rods of the conventional design which are well known to those familiar with such instruments.

The present invention is directed to a form of leveling rod, which is so constructed that lengths of thirty feet or more become entirely practical for use in surveying, and therefore permit taking lines-of-sight at much higher vertical intervals, which, in turn, permit surveying of relatively large areas with substantially fewer settings of the surveying instruments than would be required with conventional instruments. The rod of this invention has several novel features of construction which permit accurate readings to be made by the surveying crew with ease and convenience, and which are generally helpful in reducing the amount of time and labor for surveying comparatively large areas, particularly in rough and broken country.

The rod, in accordance with this invention, comprises a plurality of sections adapted to be suitably jointed together to make a long rod, which can be taken apart for ease of transportation and is preferably of tapered tubular construction to impart a considerable degree of rigidity to the assembled rod. The target member is attached to a graduated flexible metal tape, which is adapted to slide longitudinally of the rod. Suitable feeding means is provided adjacent the base of the rod whereby the tape and target carried thereby may be moved up and down the rod as required in the leveling operation, and the graduations on the tape are so arranged as to always permit direct reading of elevations to be taken from the rod with reference to a suitable index point located thereon at a convenient eye level.

It is, therefore, a principal object of this invention to provide an elongated leveling rod of improved form and construction, whereby the time and labor involved in surveying operations may be reduced.

Another object is to provide an elongated leveling rod having slidingly mounted thereon a graduated tape, carrying a conventional target member.

A further object is the provision of an elongated leveling rod formed of jointed tubular sections for greater convenience in transporting, and having a target-carrying graduated tape slidably mounted thereon.

Other objects are the provision of a novel form of tape magazine located adjacent the base of the rod and including means for feeding the tape along the rod to bring the target into coincidence with the line of sight taken with the leveling telescope; of a swivel member in the base of the rod to permit rotation thereof in accordance with the changing position of the leveling telescope; of suitable intermediate rod supporting elements; and of mechanical measuring devices associated with the measuring tape.

Various other useful objects and advantages of the device of this invention will be apparent from the following description when read in conjunction with the accompanying drawings.

Figure 8:
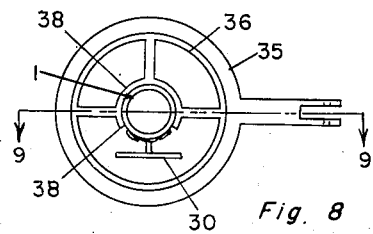
Fig. 8 is a plan view of a swivel support member employed to support the rod in vertical operating position.
Figure 9:
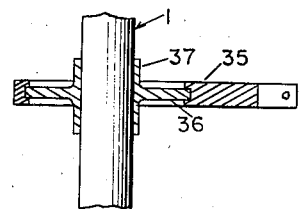
Fig. 9 is a cross-section taken along line 9—9 of Fig. 8.
Figure 2:
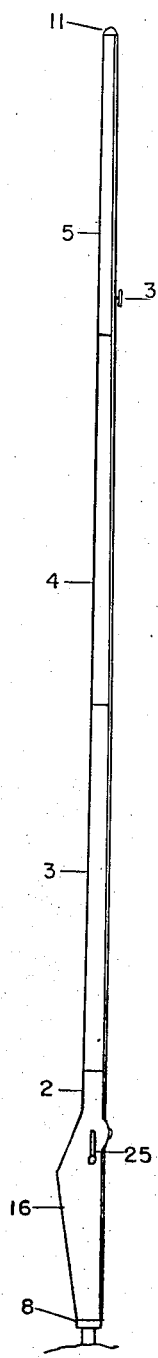
Fig. 2 is a side view of the rod of Fig. 1.
Figure 1:
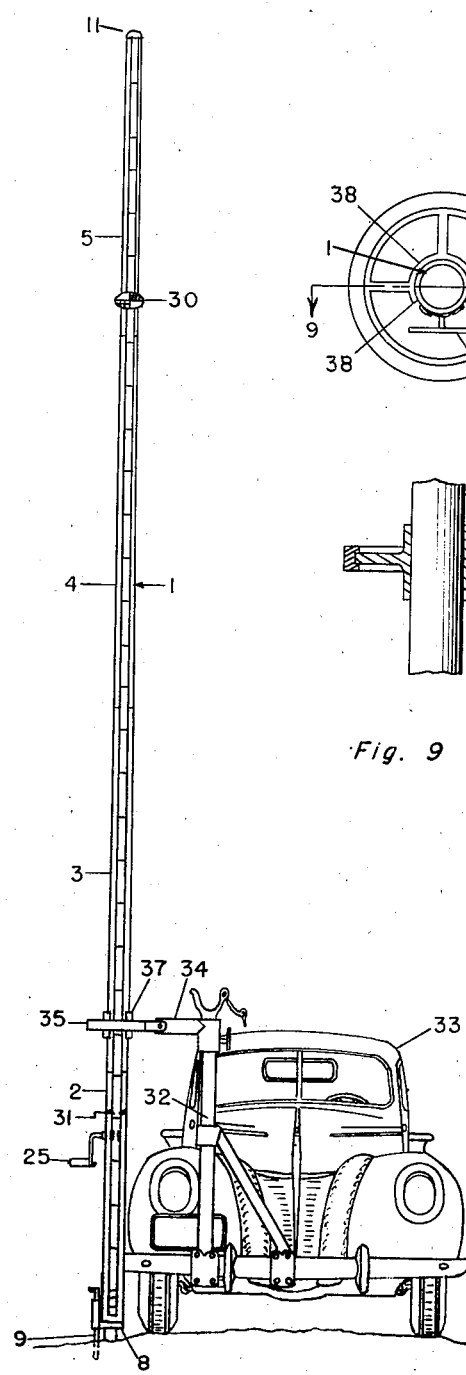
Fig. 1 is a front elevational view of a rod in accordance with this invention, the rod being shown in assembled operative position.
Figure 7:
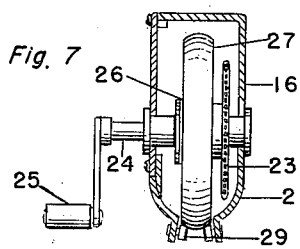
Fig. 7 is a sectional view taken generally along line 7—7 of Fig. 6.
Figure 4:
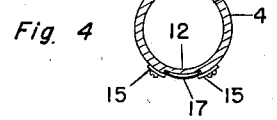
Fig. 4 is a cross-section of the rod taken along line 4—4 of Fig. 3.
Figure 3:
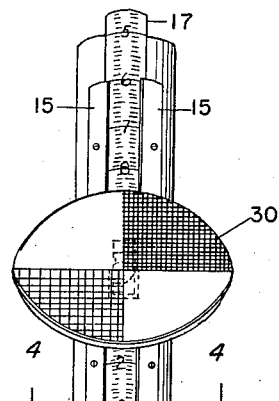
Fig. 3 is an enlarged detail of an intermediate section of the rod having portions thereof broken away for the purposes of better illustration.
Figure 3:
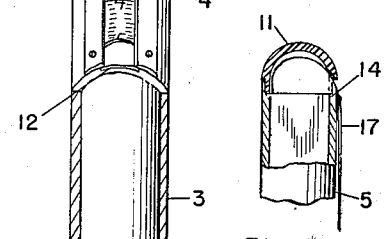

Referring to the drawings, the rod in accordance with this invention is designated generally by the numeral 1, and consists of a base section 2 and a plurality of jointed extension sections 3, 4 and 5. The base section and each of the extension sections are of generally tubular shape and each of the several sections tapers toward its upper end so that the assembled rod tapers gradually from a larger cross-sectional area at the base to a smaller cross-section at the upper end of the rod. Each of the extension sections 3, 4 and 5 has a dowel member 6, of reduced diameter extending from its lower end, and adapted to be received in close fitting engagement within the bore 7 of the next lower section which serves as a socket to receive the dowel. The generally tubular construction of the rod sections and the dowel-and-socket joints between the sections provide a rod structure of substantial rigidity throughout its extended length. A rod having an overall length of about thirty feet is found to be best adapted for most field uses. The outside diameter of such a rod varies generally from about two and one-half inches at the base, to about one and three-quarters inches at the tip, though other sizes may be used, and is preferably constructed of metal tubing of any suitable character. For lightness and convenience in handling, a light metal or metal alloy is preferable. The commercial alloy known as "Dowmetal" is found very satisfactory for this purpose.

Figure 6:
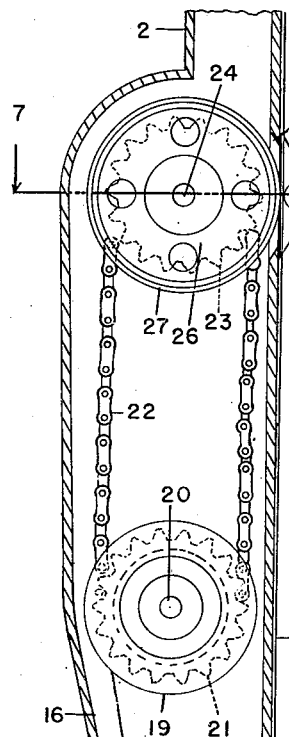
Fig. 6 is a side view of the base section of the rod having one of the side plates removed to show the details of the tape magazine mounted therein.
Figure 6:
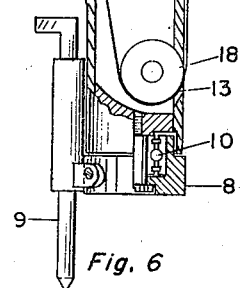

The base section 2 of the rod is rotatably mounted on a metal foot piece 8, carrying a sharpened spike member 9 at one side, which is adapted to be driven into the ground to firmly fix the position of the rod during surveying operations. A ball bearing 10 is provided between the lower end of base section 2 and the upper face of foot piece 8 to make rotation of the rod on the foot piece relatively frictionless (Fig. 6).

The upper end of the rod is closed by means of a dome shaped cap 11 which fits into the upper end of section 5 of the rod.

Extending longitudinally for the full length of the front of rod 1 is a groove 12 which is routed out of the metal of the rod. The portion of the groove on each section of the rod is arranged to register with the portions on adjacent sections. Groove 12 terminates at its lower end adjacent a slot 13, near the lower end of base section 2, which communicates with the hollow interior of the base section 2, and at its upper end adjacent an opening 14 which also communicates with the interior of section 5 of the rod just beneath cap 11. The bottom of groove 12 is preferably convex and generally concentric with walls of the rod. Paralleling the sides of groove 12 and slightly overhanging the edges thereof are a pair of guide strips 15—15, which together with groove 12 forms a guideway for the graduated tape employed with the rod.

A chamber 16, which functions as a tape magazine, is positioned adjacent the rear of base section 2 and extends longitudinally thereof for a substantial portion of the base section. Chamber 16 is in open communication with the bore of base section 2 and is also in communication with the exterior of the rod through opening 13.

Figure 5:
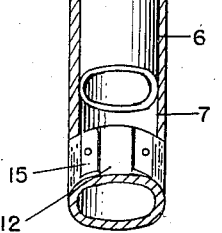
Fig. 5 is a detail of the upper end of the rod shown partly in section.

A graduated measuring tape 17, which is preferably of concave flexible metal, of the self-supporting type commonly used in flexible rules and the like, is slidably mounted in groove 12 being held in place by the overhanging edges of guide strips 15—15. The upper end of tape 17 is guided into the interior of the rod through slot 14 (Fig. 5), while the lower end enters the interior of the rod through opening 13, where it passes over a guide roller 18, and thence to a reel 19, to and from which the tape is fed in its movement along groove 12. Reel 19 is mounted on a shaft 20 which is suitable journalled in the opposite sides of chamber 16. A sprocket 21 is mounted on shaft 20 at one side of reel 19, and is connected by a chain 22 to a second sprocket 23 mounted on shaft 24 which is also journalled in the opposite sides of chamber 16 at a point above shaft 20 and sprocket 21. One end of shaft 24 extends through one wall of chamber 16 to the exterior thereof and carries a crank 25 by which shaft 24 and sprocket 23 are turned for operating reel 19 to wind or unwind tape 17 therefrom as may be desired. Shaft 24 also carries a wheel 26 having a friction tread 27 which is adapted to engage the rear face of tape 17 through a suitably placed slot 28 opening into an adjacent portion of groove 12. A pair of feed rollers 29—29 are suitably mounted on the face of rod 1 on opposite sides of groove 12 and are adapted to press against the outside of the tape 17 at the point where the tape contacts the tread face of wheel 26. By turning crank 25 in the desired direction the tape may be fed in the corresponding direction along groove 12 by the cooperative action of wheel 26 and rollers 29—29.

A target member 30 of generally conventional appearance is mounted on tape 17 and is adapted to move up and down the face of the rod with corresponding movements of the tape. Target member 30 is generally mounted on the tape a fixed distance from the upper end of the tape, for example five feet, and readings of the elevation of the target member above the base of the rod may then be taken at a convenient eye level point, positioned five feet above the base of the rod. The selected eye level reading point is referred to as the index point and is designated in the drawings by numeral 31. It will be understood that index points at other heights may be selected and the point of attachment of target member 30 to tape 17 will be altered accordingly. To permit direct reading of the elevation of target member 30 above the base of the rod, tape 17 is marked with the conventional graduations of feet, tenths and hundredths-of-feet, which are arranged to read in the reverse direction from those on conventional rods, that is, the graduations on tape 17 read from top to bottom, instead of from bottom to top.

Where rod 1 is of substantial length, it is generally advisable to support it as some intermediate point in order to steady and maintain it in its true vertical position. This may be done conveniently by providing upright 32 of any convenient height which is attached to a transport vehicle, such as a car or truck 33 and suitably braced thereon. A pivoted arm 34 extends horizontally from the upper end of upright 32 and at its outer end carries a collar member 35 which encircles an intermediate portion of rod 1. Collar member 35 carries a spider 36 which is adapted to swivel inside the collar member. Spider 36 is provided with a tubular hub 37 which fits closely about the exterior of the rod and supports it firmly in upright position. The swivel arrangement of spider 36 in collar 35 allows the rod to be freely rotated on foot piece 8 whenever desired while supporting it firmly in its vertical position. The portion of hub 37 opposite groove 12 of the rod is cut away at 38 to allow free passage of target 31 past the spider during leveling operations.

With the rod assembled from as many sections as may be desired or required for a particular surveying operation, and suitably supported in vertical position by means of the described structural members, the target member is moved up and down the rod by turning crank 25 until it coincides with the line of sight of the distant leveling telescope. Upon a suitable signal from the instrument operator, the rod man merely reads the tape graduation opposite index point 31 and a measurement of the elevations of the line of sight above the base of the rod is read directly from the tape.

When the rod is to be moved to another location, the tape is reeled into the magazine in base section 2, and the upper sections are disconnected therefrom by pulling the sections apart. The base section and the several extensions sections can then be laid down on the transporting vehicle. By placing the tape reeling mechanism in the base section all of the moving parts of the rod structure are segregated in one section of the rod and this arrangement adds greatly to the ease and safety of transporting the rod from place to place.

Figure 10:
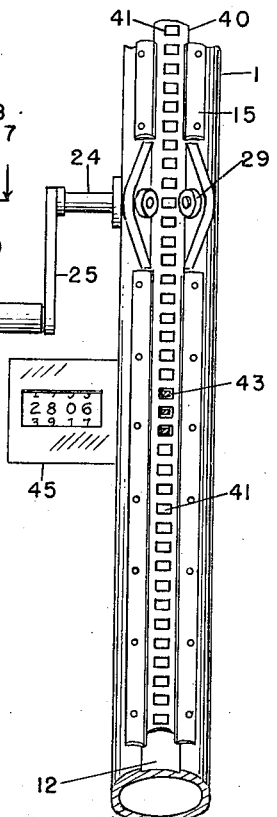
Fig. 10 is an enlarged detail comparable to that of Fig. 3 but of another modification of this invention.
Figure 11:
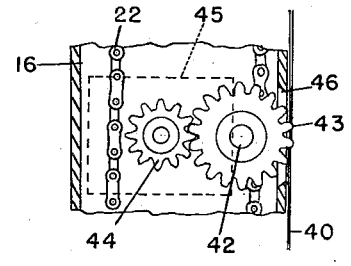
Fig. 11 is a fragmentary detail of a modified construction of the base section shown in Fig. 6 adapted particularly for use with the modification shown in Fig. 10.

Figs. 10 and 11 illustrate another modification of the rod of this invention, wherein a perforated tape 40 is employed in place of the graduated tape 17 of the previously described modification for obtaining measurements of the target level. Tape 40 is provided with a plurality of perforations 41 which are arranged in the tape to correspond to the footage marking of tape 17. A cog wheel 42, having teeth 43, is suitably journalled in chamber 16 and drives through a gear 44 to a reversible counter 45. The teeth of cog wheel 42 extend through an opening 46 in groove 12 and mesh with perforations 41. Thus as the tape 40 is fed along groove 12 by turning crank 25, just as in the previously-described modification, the engagement of the perforations 41 with teeth 43 turns the cog wheel 42 which in turn drives the counter 45. By proper selection of cog wheel and gear diameters and suitable calibration of the perforations, the movement of target 30 relative to index point 31 will be measured and recorded mechanically on counter 45 from which the elevation can be read directly.

While the tubular form of construction described is found most satisfactory in practice, other shapes of rod sections may be used, and various other modifications and alterations may be used in the size, form and arrangement of the details of this invention without departing from the scope of the appended claims.

What I claim and desire to secure by Letters Patent is:

1. A leveling rod of the class described comprising, an elongated rod, there being a guideway extending longitudinally of said rod, a tape reel mounted on said rod, a flexible tape windable on said reel and carrying a target member thereon slidably mounted in said guideway, said tape having one end free and the other attached to said reel, and friction drive means engaging said tape and driven by said reel for moving said tape in said guideway.

2. A leveling rod of the class described comprising, an elongated rod, there being a guideway extending longitudinally of said rod, a tape reel mounted on said rod, a flexible tape windable on said reel and carrying a target member thereon slidably mounted in said guideway, said tape having one end free and the other attached to said reel and having calibrations for measuring the elevation of said target member relative to a suitable index point on said rod, and friction drive means engaging said tape and driven by said reel for moving said tape in said guideway.

3. A leveling rod of the class described comprising, an elongated rod, there being a guideway extending longitudinally of said rod, a tape reel mounted on said rod, a flexible tape windable on said reel and carrying a target member thereon slidably mounted in said guideway, said tape having one end free and the other attached to said reel and having calibrations for measuring the elevation of said target member relative to a suitable index point on said rod, and friction drive means engaging said tape and driven by said reel for moving said tape in said guideway, said calibrations comprising perforations in said tape, and a mechanical counter means mounted on said rod and driven by engagement with said perforations.

4. A leveling rod of the class described comprising, a plurality of tubular sectional members including a base member adapted to be detachably joined together to form an elongated rod, there being a guideway extending longitudinally of said rod and having an arcuate guiding surface substantially concentric with said rod, a tape reel mounted in said base member, a calibrated flexible tape windable on said reel and concentrically formed relative to said guiding surface and slidable longitudinally of said guideway, the upper end of said tape being free and the lower end connected to said reel, a target member mounted on said rod and secured to said tape for movement therewith, and friction drive means engaging said tape and driven by said reel for moving said tape in said guideway.

5. A leveling rod of the class described comprising, an elongated rod rotatably supported on a foot member, there being a guideway extending longitudinally of said rod, a measuring tape slidable longitudinally in said guideway, a target member carried by said tape and movable therewith along said guideway, calibrations on said tape for measuring the elevation of said target member relative to a suitable index point on said rod, tape reeling means carried by said rod for moving the tape along said guideway, and a swivel member encircling an intermediate portion of said rod and having an opening therein to permit passage of said target member therethrough, said swivel member being adapted for attachment to a suitable supporting means for said rod.

CHESLYN H. FROST.